United States Patent [19]

Buysch et al.

[11] Patent Number: 4,749,755

[45] Date of Patent: Jun. 7, 1988

[54] IMPACT-RESISTANT THERMOPLASTIC POLYESTER COMPOSITIONS OF LOW MELT VISCOSITY, PROCESS FOR THEIR PREPARATION, AND THEIR USE FOR THE PRODUCTION OF MOULDINGS

[75] Inventors: Hans-Josef Buysch; Norbert Schön; Wolfgang Richter; Rudolf Binsack; Karl-Heinz Köhler, all of Krefeld; Dieter Rempel, Leverkusen, all of Fed. Rep. of Germany

[73] Assignee: Bayer Aktiengesellschaft, Leverkusen, Fed. Rep. of Germany

[21] Appl. No.: 868,931

[22] Filed: May 30, 1986

[30] Foreign Application Priority Data

Jun. 8, 1985 [DE]  Fed. Rep. of Germany ....... 3520661

[51] Int. Cl.[4] ............................................. C08L 69/00

[52] U.S. Cl. .................................... 525/439; 524/537; 524/539; 525/67; 525/466

[58] Field of Search .................. 525/439, 466, 67; 528/370, 372; 524/537

[56] References Cited

U.S. PATENT DOCUMENTS 3,541,183 11/1970 Kallert et al. ..................... 525/439
4,171,422 10/1979 Lazarus et al. .................... 528/437

Primary Examiner—Theodore E. Pertilla
Attorney, Agent, or Firm—Connolly & Hutz

[57] ABSTRACT

Polyalkylene terephthalates which contain small quantities of aliphatic polycarbonate show improved fracture behavior, without a significant adverse effect on the strength and the flowability in the melt. Moreover, the compositions show improved behavior in hot-air ageing.

9 Claims, No Drawings

IMPACT-RESISTANT THERMOPLASTIC POLYESTER COMPOSITIONS OF LOW MELT VISCOSITY, PROCESS FOR THEIR PREPARATION, AND THEIR USE FOR THE PRODUCTION OF MOULDINGS

The invention relates to impact-resistant, thermoplastically processable compositions of low melt viscosity, consisting of polyalkylene terephthalate and aliphatic polycarbonate of low molecular weight, to a process for the preparation of these compositions and to their use for the production of mouldings, mainly by injection-moulding.

Thermoplastic polyesters have gained increased importance as fibre raw materials and as moulding compositions because of their valuable technological properties, such as, for example, rigidity, hardness, abrasion resistance, and dynamic and thermal load-bearing capacity. Due to their high crystallinity, especially the polyesters based on terephthalic acid, ethylene glycol, 1,4-butanediol and 1,4-dimethylolcyclohexane are preferentially employed.

For many fields of application, the comparatively low toughness of the partially crystalline polyalkylene terephthalate is a disadvantage. There has therefore been no lack of attempts to improve the fracture behaviour of polyalkylene terephthalates, in particular of polyethylene terephthalate and polybutylene terephthalate.

Mixtures of polyalkylene terephthalate and polymers having glass transition temperatures below $-20°$ C. have sometimes excellent toughness (DE-OS (German Published Specification) No. 1,694,200, German Patent Specification No. 2,243,609, DE-OS (German Published Specification) No. 2,248,242, German Patent Specification No. 2,348,377, DE-OS (German Published Specification) No. 2,364,318, German Patent Specification No. 2,444,584, DE-OS (German Published Specification) No. 2,726,256 and U.S. Pat. Nos. 3,706,699, 4,086,796, 4,111,892 and 4,257,929). The polyalkylene terephthalate properties, such as, for example, the rigidity, the heat distortion and the flowability in the melt, are in most cases negatively affected by these additives.

Other methods for improving the fracture behaviour comprise the formation of cocondensates from polyalkylene terephthalates and bifunctional polymers having a low second-order transition point, for example polyether-diols or dimeric fatty acids (DE-OS (German Published Specifications) Nos. 2,035,333, 2,240,801, 2,305,499, 2,458,472, 2,460,257 and 3,314,257 and EP-A No. 19,575). The polyesters thus modified admittedly have good toughness, especially even at low temperatures, but in most cases these products have greatly reduced strengths and heat distortion points. Additions of (glass fibre-reinforced) aromatic polycarbonates to mixtures of polybutylene and polyethylene terephthalates (DE-OS (German Published Specification) No. 2,756,925) admittedly improve the notched impact strength, but they lead to an undesired increase in the melt viscosity.

Cocondensates of polyalkylene terephthalates and aliphatic low-molecular polycarbonates are also known (U.S. Pat. No. 4,171,422; DE-OS (German Published Specification) No. 2,435,507).

The object underlying the invention was therefore to obtain a sufficient improvement in the fracture behaviour of polyalkylene terephthalates by means of small quantities of a suitable modifier, without a significant adverse effect on the typical strength properties and the flowability in the melt.

Surprisingly, this object is achieved by preparing mixtures of polyalkylene terephthalate and aliphatic polycarbonate. The mechanical properties of the polyester compositions according to the invention remain almost unchanged as compared with those of the unmodified polyalkylene terephthalates; the flowability in the melt is even improved. In contrast thereto, a cocondensation of polyalkylene terephthalate and low-molecular polycarbonate leads to a marked deterioration in the mechanical property pattern, in particular the heat distortion, as compared with the mixtures according to the invention.

Polyalkylene terephthalate modified with rubber-elastic polymers as impact modifiers surprisingly exhibit improved impact strength, when they contain aliphatic polycarbonates.

The hot-air ageing behaviour of the glass fibre-reinforced mixtures according to the invention, which is greatly improved as compared with glass fibre-reinforced polybutylene terephthalate, is particularly surprising.

The invention relates to mixtures of

I. 85 to 99.5, preferably 90 to 96, % by weight of polyalkylene terephthalate,

II. 0.5 to 15, preferably 4 to 10, % by weight of polycarbonate and optionally

III. customary additives, the percentage data relating to the sum of I+II, which are characterized in that the polycarbonate II is a poly-$C_3$–$C_{12}$-alkylene carbonate having a molecular weight, determined as the number average, of 1,000 to 25,000, preferably of 1,500 to 15,000, especially of 6,000 to 12,000 (determined by vapour pressure osmometry up to molecular weights of 6,000, and by membrane osmometry above this, in each case in dichloromethane as the solvent), and that the mixtures are substantially free of phosphonium compounds from the group comprising tetra-n-$C_1$–$C_6$-alkylphosphonium acetates and -phosphonium halides. In this connection, "substantially free" means "less than 1% by weight, relative to polycarbonate"; the preferred meaning, however, is "completely free".

Polyalkylene terephthalates I within the meaning of the invention are reaction products of aromatic dicarboxylic acids or their reactive derivatives (for example dimethyl esters or anhydrides) and aliphatic, cycloaliphatic or araliphatic diols, and mixtures of these reaction products.

Preferred polyalkylene terephthalates I can be prepared from terephthalic acid (or its reactive derivatives) and aliphatic diols having 2 to 10 C atoms or cycloaliphatic diols having 6 to 12 C atoms by known methods (Kunststoff-Handbuch [Plastics Handbook], volume VIII, pages 695 et seq., Carl Hanser Verlag, Munich, 1973).

Preferred polyalkylene terephthalates I contain at least 80 and preferably at least 90 mol %, relative to the dicarboxylic acid component, of terephthalic acid radicals and at least 80 and preferably at least 90 mol %, relative to the diol component, of ethylene glycol and-/or 1,4-butanediol radicals.

In addition to the terephthalic acid radicals, the preferred polyalkylene terephthalates I can contain up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

In addition to ethylene glycol and/or 1,4-butanediol radicals, the preferred polyalkylene terephthalates I can contain up to 20 mol %, preferably up to 10 mol %, of radicals of other aliphatic diols having 3 or 5 to 12 C atoms or cycloaliphatic diols having 6 to 21 C atoms (aliphatic diols are here to be understood as compounds, the hydroxyl groups of which are bonded to carbon atoms belonging to an aliphatic grouping), for example radicals of 1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3- and 1,5-pentanediol, 2-ethyl-1,3-hexanediol, 2,2-diethyl-1,3-propanediol, 2,5-hexanediol, 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis-(4-hydroxypropoxyphenyl)-propane (DE-OS (German Published Specifications) Nos. 2,407,674, 2,407,776 and 2,715,932).

The polyalkylene terephthalates I can be branched by means of incorporating relatively small quantities of 3-hydric or 4-hydric alcohols or 3-basic or 4-basic carboxylic acids, for example according to DE-OS (German Published Specification) No. 1,900,270 and U.S. Pat. No. 3,692,744. Examples of preferred branching agents are trimesic acid, trimellitic acid, trimethylolethane and -propane and pentaarythritol.

Particularly preferred are those polyalkylene terephthalates I which have been prepared solely from terephthalic acid or its reactive derivatives (for example its dialkyl esters) and ethylene glycol and/or 1,4-butanediol, and mixtures of these polyalkylene terephthalates.

Preferred mixtures contain 1 to 50, preferably 1 to 30, % by weight of polyethylene terephthalate and 50 to 99, preferably 70 to 99, % by weight of polybutylene terephthalate.

The polyalkylene terephthalates, preferably used as the component I, in general have an intrinsic viscosity of 0.4 to 1.5 dl/g, preferably 0.5 to 1.3 dl/g, especially 0.6 to 1.2 dl/g, measured in each case in phenol/o-dichlorobenzene (1:1 parts by weight) at 25° C. in an Ubbelohde viscometer.

Polycarbonates II within the meaning of the invention are reaction products of aliphatic diols having 3-12, preferably 3-6, carbon atoms and reactive carbonic acid derivatives, such as dialkyl and diaryl carbonates, chlorocarbonates and phosgene.

Examples of preferred aliphatic diols having 3-6 carbon atoms are 1,3-propanediol, 1,4-butanediol, 1,5-pentanediol, 2-ethyl-1,3-propanediol, 2,2-dimethyl-1,3-propanediol and especially 1,6-hexanediol.

To a minor extent, less than 5% by weight, preferably less than 2% by weight, relative to the sum of the alcohol components, of trifunctional or polyfunctional alcohols, such as pentaerythritol, trimethylolethane and preferably trimethylolpropane, can be employed as branching agents.

Moreover, cocondensates of the abovementioned polycarbonates with one another or with polyetherdiols can be used as the component II, examples of the polyetherdiol component used being diethylene glycol, dipropylene glycol, tri-, tetra- and octa-ethylene glycol, polytetrahydrofuran and other polyalkylene glycols having a molecular weight, determined as the number average, of up to 3,000. The polyether-diol fraction can here amount to up to 30% by weight, but preferably from 10 to 25% by weight, relative to the total weight of the component II.

According to a preferred embodiment of the invention, a polyalkylene terephthalate having an Intrinsic viscosity of at least 1.2 dl/g, preferably at least 1.25 dl/g (determined as explained above) and a polycarbonate containing from 10 to 25% by weight, relative to the total weight of the component II, of units of ether group-containing diols, wherein preferably from 2 to 4 carbon atoms are separated by ether oxygen atoms in any case, are used as components I and II. The mixtures of this preferred embodiment advantageously yield the effects of the invention with very small quantities of polycarbonate II.

The aliphatic polycarbonates II can possess isocyanate, $C_2$-$C_{10}$-alkyl urethane or $C_1$-$C_6$-alkoxycarbonyl and groups, but preferably hydroxyl end groups. They can be prepared by processes known from the literature; compare, for example, J. Am. Chem. Soc. 80, 4596 (1958); 55, 5031 (1933); 52, 314 (1930); Houben-Weyl, Methoden der organischen Chemie [Methods of Organic Chemistry], volume E4, pages 64 et seq. (1983).

As the component III, the moulding compositions according to the invention can, for example, contain customary additives, such as lubricants and mould-release agents, nucleating agents, stabilizers, fillers and reinforcing agents, flame-proofing agents, dyestuffs as well as rubber-elastic polymers.

The filled or reinforced moulding compositions can contain up to 60 and preferably 10 to 60% by weight of fillers and/or reinforcing materials relative to the filled or reinforced moulding composition. Glass fibres are the preferred reinforcing materials. Examples of preferred fillers, which can also have a reinforcing effect, are glass beads, mica, silicates, quartz, talc, titanium dioxide and wollastonite.

The moulding compositions finished with flame-proofing agents contain flame-proofing agents in a concentration of generally 3 to 15% by weight, relative to the flame-proofed moulding compositions.

All the known flame-proofing agents can be used, such as, for example, polyhalogenodiphenyl, polyhalogenodiphenyl ether, polyhalogenophthalic acid and its derivatives, and polyhalogeno-oligo- and -poly-carbonates, the corresponding bromine compounds being particularly effective. In addition, they contain as a rule a synergist such as, for example, antimony trioxide.

Preferred examples of suitable rubber-elastic polymers III, which in general can be used in amounts of from 10 to 40% by weight, relative to the sum of components I and II, include copolymers, in particular graft copolymers, having a glass transition temperature below −30° C., of the type obtained essentially from at least two of the following monomers: chloroprene, buta-1,3-diene, isoprene, styrene, acrylonitrile, ethylene, propylene, vinylacetate and (meth)acrylic acid esters containing from 1 to 18 carbon atoms in the alcohol component, in other words polymers of the type described, for example in "Methoden der Organischen Chemie" (Houben-Weyl), volume 14/1, Georg Thieme Verlag, Stuttgart 1961, pages 393 to 406 and in C. B.

Bucknall, "Toughened Plastics", Appl. Science Publishers, London 1977. Preferred polymers III are at least partially cross-linked and have gel contents above 20, preferably above 40% by weight, in particular above 60% by weight.

Ethylene/vinylacetate copolymers containing from 15 to 60% by weight of vinylacetate radicals and having melt indices of from non-flowing to 1000, preferably, from 0.1 to 20, measured at 190° C. and 2.16 kg load according to DIN 53 735 are preferred polymers III.

Preferred polymers III also include the so-called EPM and EPDM rubbers in which the ratio by weight of ethylene to propylene radicals lies in the range of from 40:60 to 65:35.

The Mooney viscosities ($ML_1$ 4/100° C. of the EPM and EPDM rubbers can lie between 25 and 200, preferably between 35 and 120.

The ethylene/propylene copolymers (EPM) used have substantially no double-bonds, whereas the ethylene/propylene/diene terpolymers (EPDM) can contain from 1 to 20 double-bonds/1000 carbon atoms. Suitable diene monomers in the EPDM include, for example, conjugated dienes, for example isoprene and buta-1,3-diene, and non-conjugated dienes containing from 5 to 25 carbon atoms, for example 1,4-pentadiene, 1,4-hexadiene, 1,5-hexadiene, 2,5-dimethyl-1,5-hexadiene and 1,4-octadiene; cyclic dienes, for example, cyclopentadiene, cyclohexadiene, cyclooctadiene and dicyclopentadiene; alkenyl norbornenes, for example, 5-ethylidene-2-norbornene, 5-butylidene-2-norbornene, 2-methallyl-5-norbornene, 2-isopropenyl-5-norbornene and tricyclodienes.

The non-conjugated dienes hexane-1,5-diene, ethylidene-norbornene or dicyclopentadiene are preferred. The diene content in the EPDM is preferably from 0.5 to 10% by weight.

EPM or EPDM rubbers of this type are described, for example, in DE-OS No. 2,808,709.

Preferred polymers III also include selectively hydrogenated block copolymers of a vinyl-aromatic monomer and a conjugated diene. These block copolymers are known. The technology described in "Encyclopaedia of Polymer Science and Technology", volume 15, Interscience, N.Y. (1971) on pages 508 et seq. used for producing styrene-diene block copolymers can generally be used for producing suitable block copolymers from styrene, α-methyl styrene, vinyl toluene etc. and from conjugated dienes such as butadiene, isoprene etc. Selective hydrogenation can be carried out in a known manner, the ethylenic double-bonds being essentially completely hydrogenated while the aromatic double-bonds remain essentially unaffected. Block copolymers selectively hydrogenated in this way are described, for example, in DE-OS No. 3,000,282.

Graft polymers are particularly preferred polymers III.

Preferred graft polymers III possess average particle diameters $d_{50}$ of from 0.05 to 1, preferably 0.1 to 0.8, in particular from 0.2 to 0.6 μm.

The average particle diameter $d_{50}$ is the diameter above and below which there are 50% by weight of the particles respectively. It can be determined by ultracentrifuge measurement (W. Scholtan, H. Lange, Kolloid, Z. and Z. Polymere 250 (1972) 782–796) or by electron microscopy and subsequent counting out of particles (G. Kämpf, H. Schuster, Angew. Makromolekulare Chemie 14, (1970), 111–129).

The graft polymers III are cross-linked and have gel contents of at least 50% by weight, preferably at least 80% by weight and, in particular of at least 90% by weight, based on graft polymer III.

The gel content of the cross-linked diene rubbers is determined at 25° C. in toluene, the gel content of the cross-linked acrylate rubbers at 25° C. in dimethyl formamide (M. Hoffmann, H. Krömer, R. Kuhn, Polymeranalytik I and II, Georg Thieme Verlag Stuttgart 1977).

Preferred graft polymers III are graft polymers of from 15 to 60, preferably from 20 to 50, in particular from 25 to 40% by weight of at least one vinyl or vinylidene monomer from the series comprising styrene, α-methylstyrene, acrylonitrile, $C_1$–$C_8$-alkylacrylate, $C_1$–$C_8$-alkylmethacrylate, hydroxy-$C_2$–$C_8$-alkyl(meth)acrylate, epoxy-$C_2$–$C_8$-alkyl-(meth)acrylate to from 40 to 85, preferably from 50 to 80, in particular from 60 to 75% by weight of particulate cross-linked diene rubber or acrylate rubber, based on graft polymer III in each case.

Methylmethacrylate and mixtures of styrene and methylmethacrylate and mixtures of styrene and acrylonitrile are preferred graft monomers.

Cross-linked homo and/or copolymers of conjugated $C_4$–$C_6$-dienes are preferred diene rubbers. Buta-1,3-diene is the preferred diene. The diene copolymers can contain, in addition to the diene radicals, up to 30% by weight, based on diene copolymer, of radicals of other ethylenically unsaturated monomers such as styrene, acrylonitrile, esters of acrylic acid or methacrylic acid with monovalent $C_1$–$C_4$-alcohols such as methacrylate, ethylacrylate, methylmethacrylate, ethylmethacrylate.

The production of the diene rubber grafting matrix and the graft polymers produced therefrom is described, for example, in "Methoden der Organischen Chemie" (Houben-Weyl), volume 14/1, Georg Thieme Verlag, Stuttgart 1961, pages 393–406, and in Ullmanns Encyclopädie der technischen Chemie, fourth edition, volume 19, Verlag Chemie, Weinheim, 1981, pages 279 to 284.

Polymers of the type obtained by polymerization of $C_1$–$C_8$-alkylacrylates are preferred grafting matrices. The polymers can also be copolymers of acrylic acid waters with up to 40% by weight, based on copolymer, of other vinyl monomers such as styrene, acrylonitrile, methylmethacrylate, vinylester, vinylether.

The acrylate rubbers are cross-linked.

Preferred examples of cross-linking monomers containing more than one copolymerizable double-bond include esters of unsaturated $C_3$–$C_{12}$-alcohols or saturated $C_2$–$C_{20}$-polyols containing from 2 to 4 OH groups, for example, multiply unsaturated heterocyclic compounds such as trivinylcyanurate, triallylcyanurate, and -isocyanurate, in particular triallylcyanurate, polyfunctional vinyl compounds such as di- and trivinyl benzenes, but also triallylphosphate.

Preferred cross-linking monomers include allylmethacrylate, ethylene glycol dimethacrylate, diallylphthalate and heterocyclic compounds, which generally contain three copolymerizable ethylenically unsaturated double-bonds.

The cyclic monomers triallylcyanurate, triallylisocyanurate, trivinylcyanurate, tris-acryloylhexahydro-s-triazine, triallylhenzene are particularly preferred cross-linking monomers.

The quantity of cross-linking monomers is preferably from 0.02 to 5, in particular from 0.05 to 2% by weight, based on rubber grafting matrix.

Acrylate rubbers can also be multi-shelled products containing a cross-linked diene rubber composed of one or more conjugated dienes such as polybutadiene, or a copolymer of a conjugated diene with an ethylenically unsaturated monomer such as styrene and/or acrylonitrile as nucleus and a polymerized acrylate monomer as shell.

The proportion of the polydiene nucleus in these multi-shell rubbers can amount to from 0.1 to 80, preferably from 10 to 50% by weight. The shell(s) and nucleus can be partially cross-linked or highly cross-linked independently of each other.

Preferred grafted acrylate rubbers are those which
(a) are cross-linked with cyclic trifunctional comonomers such as triallylcyanurate and triallylisocyanurate (described in DE-OS No. 3,039,114);
(b) contain a polybutadiene nucleus (described in DE-OS No. 3,039,115);
(c) have been produced "in the absence of suspending agent" (described in DE-OS No. 3,117,052).

During the production of the graft polymers III by graft copolymerization, which is usually carried out in the presence of radical starters, for example, water-soluble initiators, emulsifiers or complex-forming agents/graft activators as well as regulators, free polymers or copolymers of the graft monomers forming the graft shell are generally formed to a certain extent in addition to the actual graft copolymer.

Graft polymers III in the context of the invention are therefore products obtained by polymerization of graft monomers in the presence of the rubber latex, more precisely generally a mixture of graft copolymer and free (co)polymer of the graft monomers.

The moulding compositions according to the invention have optimal properties if the quantity of free (co)polymer does not exceed 15% by weight, preferably 10% by weight, in particular 7% by weight, based on component III. The Staudinger index of these free (co)polymers should be less than 0.6 dl/g, preferably less than 0.4 dl/g, measured in dimethyl formamide at 25° C.

Preferred graft diene rubbers are described, for example, in DE-OS Nos. 2,348,377 and in 2,927,576, 3,025,605, and preferred grafted acrylate rubbers, for example, in DE-OS Nos. 2,444,584 and in 2,726,256, 3,039,114, 3,039,115, 3,117,052.

The preparation of the mixtures of thermoplastic polyester I, polycarbonate II and optionally further components III can be carried out in the customary mixing units, such as roll mills, kneaders and single-screw and multi-screw extruders. The temperature during the preparation of the mixtures should be at least 10° C. and advantageously at most 90° C. above the melting point of the polyester.

The mixing can be carried out discontinuously or continuously under conditions which largely exclude oxidation, that is to say under an inert blanketing gas such as nitrogen, carbon dioxide, argon or helium and/or under reduced pressure.

It cannot be excluded that the mixtures according to the invention lead to a small extend to polyestercarbonates due to transesterification during the compounding or processing. As a rule, the mixtures according to the invention contain less than 30, preferably less than 20 and especially less than 15% by weight of polyester carbonate.

In order to avoid an undesired transesterification, it can be expedient to add an effective quantity of a transesterification inhibitor to the mixtures according to the invention. Such inhibitors are known; compare, for example, J. Devaux, P. Godard and J. P. Mercier in Polym. Eng. Sci. 22 (4), 229–233 81982). Preferred inhibitors are phosphorous acid esters such as, for example, triphenyl phosphite, diphenyl phosphite, dibenzyl phosphite, decyl diphenyl phosphite, phenyl didecyl phosphite and di-n-octadecyl phosphite. They are preferably employed in quantities of 0.1 to 1% by weight, relative to the mixtures according to the invention.

The thermoplastically processable compositions according to the invention can be used, for example, for the production of housing parts, plug connections and other thin-walled injection-mouldings.

EXAMPLES

Polycarbonate A 136 g (1.15 mol) of 1,6-hexanediol were distilled off from a mixture of 2.50 kg (1.17 mol*) of polyhexamethylene carbonate ($M_N$=2,140; OH number=52.5) and 1.50 g (1.90 mmol) of titanium tetradodecylate in the course of 4 hours at 180°–220° C./3.5–0.4 mbar, with stirring. The residue was comminuted after cooling. This gave a polyhexamethylene carbonate with OH number: 22.5

*The mol figure of the polydisperse system is understood as:

$$\text{Moles} = \frac{\text{Moles of OH groups}}{\text{Functionality of the polymer}} = \frac{\text{OH number} \times \text{weight in kg}}{56.11 \times \text{functionality}}$$

The functionality of the polyhexamethylene carbonate is 2.

Molar mass ($M_N$); 5,000
Melting range: 55°–60° C.

Polycarbonate B 1770 g of an ethanol/diethyl carbonate mixture with 1550 g (33.7 mol) of ethanol were distilled off from a mixture of 2.00 kg (17.0 mol) of 1,6-hexanediol, 2.60 kg (22.0 mol) of diethyl carbonate and 200 mg of potassium carbonate under normal pressure through a 60 cm long packed column at 100°–180° C., and a further 324 g of ethanol/diethyl carbonate mixture with 28 g (0.62 mol) of ethanol were distilled off at 140°–180° C./200–22 mbar. The residue was dissolved in methylene chloride, the solution was extracted several times with water by shaking, the organic phase was dried with sodium sulphate and the solvent was distilled off in vacuo. This gave a polyhexamethylene carbonate with ethoxycarbonyloxy end groups.

Molar mass ($M_N$): 1500

Polycarbonate C 1.00 kg (0.47 mol*) of polyhexamethylene carbonate ($M_N$=2140; OH number =52.5) was stirred in portions within 70 minutes at 80° C. under a nitrogen atmosphere into 222 g (1.00 mol) of isophorone diisocyanate and 150 g of dibutyl-tin dilaurate, and the mixture was left at this temperature for a further 2 hours. This gave a polyhexamethylene carbonate with isocyanate end groups.

NCO value; 0.805 mmol of NCO/g of substance
Molar mass ($M_N$): 2480

Polycarbonate D

A mixture of 1.60 kg (0.800 mol) of polyhexamethylene carbonate ($M_N=2140$; OH number=52.5), 400 g (0.400 mol) of a polytetramethylene oxide ($M_N=1000$; OH number=112), 203 g (0.950 mol) of diphenyl carbonate and 500 mg of dibutyl tin dilaurate was stirred for 12 hours at 120°-170° C./3.0–0.3 mbars, and 175 g of phenol were distilled off. The resulting residue was comminuted. This gave an ether groups-containing polyhexamethylene carbonate with
OH number: 7
Molar mass ($M_N$): 14000

Polycarbonate E

A mixture of 2.00 kg (0.935 mol) of polyhexamethylene carbonate ($M_N=2140$; OH number=52.5), 164 g (0.767 mol) of diphenyl carbonate and 200 mg of dibutyl tin dilaurate were stirred for 12 hours at 120°-170° C./3.0–0.5 mbars, and 143 g of phenol were distilled off. The resulting residue was comminuted. This gave a polycarbonate with OH number: 9.5
Molar mass ($M_N$): 11500
Melting range: 55° to 60° C.

Compounding

The products for the examples were prepared from a twin-screw extruder. Before processing, the granulated product was dried for 5 hours at 120° C. in a circulating-air oven. The standard test specimens used were prepared in customary injection-moulding machines (mould temperature 80° C.; melt temperature 250°-260° C.). The thermal and mechanical properties were determined according to DIN and ASTM standards (see the examples). The flow lengths of the polycondensate melt were determined in a flow spiral of 10 mm diameter and 2 mm thickness under constant injection pressure and temperature conditions.

EXAMPLES 1-6

Moulding compositions were prepared on twin-screw extruders at 260° C. melt temperature from an unreinforced polybutylene terephthalate (intrinsic viscosity=1.25 dl/g) and in each case one of the aliphatic polycarbonates A–C. The composition and the properties of the modified polybutylene terephthalates are summarized in Table 1 and compared with values for unmodified polybutylene terephthalate.

TABLE 1

| Example | 1 | 2 | 3 | 4 | 5 | 6 |
|---|---|---|---|---|---|---|
| % by weight of PBT | 97 | 95 | 92 | 95 | 95 | 100 |
| Polycarbonate/% by weight | A/3 | A/5 | A/8 | B/5 | C/5 | — |
| Izod (J/m) (ASTM D 256) | 45 | 48 | 52 | 42 | 42 | 37 |
| Flow Length (cm) | 54 | 56 | 68 | 53 | 54 | 48 |
| MFI* (g/10 minutes) (DIN 53 735) | 18 | 20 | 25 | 19 | 17 | 16 |
| Vicat B (°C.) (DIN 53 460) | 180 | 179 | 177 | 180 | 178 | 181 |
| Tensile modulus of elasticity (MPa) (DIN 53 457) | 2500 | 2500 | 2450 | 2480 | 2450 | 2550 |

*Melt index

EXAMPLES 7-10

Moulding compositions were prepared on twin-screw extruders at 260° C. melt temperature from a polybutylene terephthalate (intrinsic viscosity=0.92 dl/g) reinforced with 30% by weight of glass fibre and in each case one of the aliphatic polycarbonates A or B. The composition and the properties of the modified polybutylene terephthalates are summarized in Table 2 and compared with the values for unmodified polybutylene terephthalate.

TABLE 2

| Example | 7 | 8 | 9 | 10 |
|---|---|---|---|---|
| % by weight of PBT | 95 | 92 | 95 | 100 |
| Polycarbonate/% by weight | A/5 | A/8 | B/5 | — |
| Izod (J/m) (ASTM D 256) | 98 | — | 90 | 84 |
| Flow Length (cm) | 60 | 66 | 61 | 56 |
| MFI (g/10 minutes) (DIN 53 735) | 22 | 24 | 19 | 17 |
| Vicat B (°C.) (DIN 53 460) | 210 | 210 | 212 | 214 |
| Tensile modulus of elasticity (MPa) (DIN 53 457) | 9750 | 9780 | 9870 | 10600 |

EXAMPLES 11-13

Hot-air ageing behaviour

Moulding compositions of a glass fibre-reinforced polybutylene terephthalate and the aliphatic polycarbonate A, as described in Examples 7 and 8, were injection-moulded to give standard small bars (50×6×4 mm) and heated in a hot-air oven to the temperatures indicated in Table 3. After the indicated stress times, the impact strength was determined in each case.

TABLE 3

| Example | | 11 | 12 | 13 |
|---|---|---|---|---|
| % by weight of PBT | | 95 | 92 | 100 |
| Polycarbonate/% by weight | | A/5 | A/8 | — |
| RT | 0 hours | 44 | 44 | 46 |
| 140° C. | 300 hours | 42 | 47 | 40 |
| | 1000 hours | 40 | 46 | 34 |
| | 2000 hours | 34 | 46 | 33 |
| $a_n$ (kJ/m$^2$) | 100 hours | 39 | 42 | 35 |
| 160° C. | 300 hours | 38 | 47 | 37 |
| | 1000 hours | 36 | 43 | 32 |
| | 2000 hours | 37 | 37 | 25 |

EXAMPLES 14-17

Moulding compositions comprising a polybutylene terephthalate (having an Intrinsic viscosity of 1.25 dl/g), 20% by weight of an ADC graft copolymer and an aliphatic polycarbonate were prepared on a twin screw extrude at a mass temperature of 260° C. The compositions and their properties are listed in Table 4 and compared with the values for compositions without polycarbonate.

TABLE 4

| Example | 14 | 15 | 16 | 17 |
|---|---|---|---|---|
| % by weight of PBT | 77 | 76 | 76 | 75 |
| Polycarbonate/% by weight | — | E/1 | D/1 | D/2 |
| Izod (kJ/m$^2$) at | | | | |
| 25° C. | 62 | 73 | 77 | 81 |
| 0° C. | 48 | 62 | 72 | 75 |
| −10° C. | 18 | 23 | 21 | 20 |
| Vicat B (°C.) | 128 | 126 | 132 | 120 |
| Tensile modulus of elasticity (MPa) | 1680 | 1600 | 1644 | 1500 |
| Flow length (cm) | 38 | 40 | 42 | 43 |

The measured values in Tables 1, 2 and 4 show the markedly improved flowability (up to about 45%) and notched impact strength (up to 40%) of the moulding compositions according to the invention. The improved hot-air ageing behaviour of the modified polybutylene terephthalate moulding compositions as compared with the unmodified types is evident from the measured values in Table 3. Whereas under prolonged thermal stress (160° C.) the level of the impact strength of the unmodified polyester decreases by about 45%, a considerably smaller reduction in impact strength by about 15%, starting from approximately the same level, is observed in the case of polycarbonate-modified PBT types. At a slightly lower ageing temperature of 140° C., the impact strength of the initial value is preserved on addition of sufficient quantities of polycarbonate, and even slightly improved. These improvements in the properties are achieved without a noticeable deterioration in the other mechanical properties.

We claim:
1. Mixtures of
   I. 85 to 99.5% by weight of polyalkylene terephthalate and
   II. 0.5 to 15% by weight of polycarbonate,
the percentage data relating to the sum of I+II, characterized in that the polycarbonate II is a poly- $C_3$–$C_{12}$-alkylene carbonate having a molecular weight, determined as the number average, of 1,000 to 25,000, and that the mixtures are substantially free of phosphonium compounds from the group comprising tetra-n-$C_1$–$C_6$-alkyl-phosphonium acetates and -phosphonium halides.

2. Mixtures according to claim 1 of 90 to 96% by weight of component I and 4 to 10% by weight of component II.

3. Mixtures according to claims 1 or 2, wherein the molecular weight $M_n$ of the polycarbonate II is 1,500 to 15,000.

4. Mixtures according to claims 1 or 2, wherein the molecular weight $M_n$ of the polycarbonate II is 6,000 to 12,000.

5. Mixtures according to claims 1 or 2, wherein component II is a poly-$C_3$–$C_6$-alkylene carbonate.

6. Mixtures according to claims 1 or 2, wherein component II is a 1,6-hexanediol polycarbonate.

7. Mixtures according to claims 1 or 2, wherein component I has an intrinsic viscosity of at least 1.2 dl/g and wherein component II is a polycarbonate with 10 to 25% by weight, relative to the total weight of component II, of residues of ether group-containing diols.

8. Mixtures according to claims 1 or 2, which contain 10 to 60% by weight of fillers, reinforced materials and mixtures thereof, relative to the filled and reinforced mixture.

9. Process for preparing the mixtures according to claims 1 or 2, characterized in that the components are kneaded or extruded on suitable machines at least 10° C. and at most 90° C. above the melting point of component I.

* * * * *